United States Patent
Chen et al.

(10) Patent No.: US 8,834,584 B2
(45) Date of Patent: Sep. 16, 2014

(54) METHOD OF ASSEMBLY AND APPARATUS FOR COOLING SYNGAS

(75) Inventors: Lien-Yan Chen, Spring, TX (US); James Michael Storey, Houston, TX (US); Yasir H. Abbasi, Houston, TX (US); George Dodan, Katy, TX (US)

(73) Assignee: General Electric Company, Schenectady, NY (US)

( * ) Notice: Subject to any disclaimer, the term of this patent is extended or adjusted under 35 U.S.C. 154(b) by 481 days.

(21) Appl. No.: 12/568,275

(22) Filed: Sep. 28, 2009

(65) Prior Publication Data

US 2011/0072721 A1 Mar. 31, 2011

(51) Int. Cl.
| | | |
|---|---|---|
| *B01J 7/00* | (2006.01) | |
| *C10J 3/86* | (2006.01) | |
| *F02C 3/28* | (2006.01) | |
| *F28D 7/00* | (2006.01) | |
| *F28D 7/16* | (2006.01) | |
| *F28D 21/00* | (2006.01) | |

(52) U.S. Cl.
CPC ............ *F02C 3/28* (2013.01); *F28D 2021/0075* (2013.01); *C10J 2300/1678* (2013.01); *Y02E 20/18* (2013.01); *C10J 2300/1653* (2013.01); *C10J 3/86* (2013.01); *F28D 7/0041* (2013.01); *F28D 7/1669* (2013.01)
USPC .......................................................... 48/61

(58) Field of Classification Search
CPC ...... C10J 3/86; C10J 2300/1884; C10J 3/845; C10J 2300/093; C10J 2300/1653; C10J 2300/1678; C10J 2300/1687; C10J 2300/1892; C10J 3/485; C10J 3/84; C10K 1/101; C10K 1/04; C01B 3/52; Y02E 20/18; Y02E 20/16; F28D 2021/0075; F28D 7/0041; F28D 7/00; F28D 7/163; F28D 7/1669; F22B 1/1846; F22B 1/18; F22B 1/1838; F22B 21/06
USPC ...... 48/61–118.5, 127.1, 127.9, 197 R–197 A
See application file for complete search history.

(56) References Cited

U.S. PATENT DOCUMENTS

| | | | |
|---|---|---|---|
| 4,395,268 | A | 7/1983 | Zabelka |
| 5,233,943 | A | 8/1993 | Martin et al. |

(Continued)

FOREIGN PATENT DOCUMENTS

| | | |
|---|---|---|
| CN | 101351622 A | 1/2009 |
| CN | 101589129 A | 11/2009 |
| EP | 0048325 A2 | 3/1982 |

(Continued)

OTHER PUBLICATIONS

PL Search Report issued in connection with corresponding PL Patent Application No. P-392519 filed on Sep. 27, 2010.

(Continued)

*Primary Examiner* — Imran Akram
(74) *Attorney, Agent, or Firm* — Armstrong Teasdale LLP

(57) ABSTRACT

A syngas cooler for use in a gasification system is described that includes a head portion including a plurality of conduit headers. The syngas cooler also includes an annular shell portion including a plurality of conduits, the plurality of conduits configured to be coupled in flow communication with the plurality of conduit headers. The syngas cooler also includes a quench portion configured to remove particulates entrained in a flow of syngas flowing through the syngas cooler. The head portion and the shell portion are configured to be coupled together with a circumferential seam weld.

9 Claims, 3 Drawing Sheets

(56) References Cited

U.S. PATENT DOCUMENTS

| | | | |
|---|---|---|---|
| H1325 | H | 7/1994 | Doering et al. |
| 5,866,091 | A | 2/1999 | Stevenson et al. |
| 7,587,995 | B2 | 9/2009 | Kraft et al. |
| 2008/0041572 | A1 | 2/2008 | Wessel et al. |
| 2010/0263841 | A1* | 10/2010 | Corry et al. .................. 165/133 |

FOREIGN PATENT DOCUMENTS

| | | |
|---|---|---|
| EP | 0127092 A | 5/1984 |
| PL | 374248 | 10/2006 |

OTHER PUBLICATIONS

Office Action from corresponding CN Application No. 201010508049.X, dated Jul. 1, 2013.

* cited by examiner

METHOD OF ASSEMBLY AND APPARATUS FOR COOLING SYNGAS

BACKGROUND OF THE INVENTION

The present application relates generally to integrated gasification combined-cycle (IGCC) power generation systems, and more specifically to a method of assembly and apparatus for cooling syngas.

At least some known gasifiers convert a mixture of fuel, air or oxygen, liquid water and/or steam, and/or slag into an output of partially oxidized gas, sometimes referred to as "syngas." In an integrated gasification combined-cycle (IGCC) power generation system, syngas is supplied to the combustor of a gas turbine engine, which powers a generator that supplies electrical power to a power grid. Exhaust from the gas turbine engines may be supplied to a heat recovery steam generator that generates steam for driving a steam turbine. Power generated by the steam turbine also drives an electrical generator that provides electrical power to the power grid.

In some known IGCC plants, hydro-carbonaceous feeds that include coal, petroleum coke and high-ash residual oils, are reacted with high purity oxygen (typically 95% oxygen purity) to produce syngas in a temperature range of 2200° F. to 2700° F. Heat in this syngas is recovered as the syngas is channeled from a radiant syngas cooler (RSC) to a convective syngas cooler (CSC). Known radiant syngas coolers that use radiation as the primary heat transfer mechanism generally cool the syngas to a range of about 1100° F. to about 1200° F. and generate high pressure steam therefrom.

At least some known radiant syngas coolers are very large pressure vessels that may extend over 30 meters in height and weigh more than 300 metric tons. Because of the large size and weight of such radiant syngas coolers, the coolers cannot be delivered to a site in a fully assembled condition. Rather, such coolers must be shipped in parts and assembled at the site. Known radiant syngas coolers use multiple flanges to couple a head portion of the radiant syngas cooler to a shell portion. However, the size and other logistical considerations may make the process of coupling the head portion to the shell portion time-consuming and/or costly. Moreover, because multiple flanges are used to connect the head portion, over time, the shell portion may develop leakage through adjacent flanges or components. Moreover, the use of multiple flanges may increase the overall weight to be added to an already heavy radiant syngas cooler.

BRIEF DESCRIPTION OF THE INVENTION

In one embodiment, a syngas cooler for use in a gasification system is provided. The syngas cooler includes a head portion including a plurality of conduit headers and an annular shell portion including a plurality of conduits, wherein the plurality of conduits are configured to be coupled in flow communication with the plurality of conduit headers. The syngas cooler also includes a quench portion configured to remove particulates entrained in a flow of syngas flowing through the syngas cooler. The head portion and the shell portion are configured to be coupled together with a circumferential seam weld.

In another embodiment, a gasification system is provided that includes a gasifier and a syngas cooler. The syngas cooler includes a head portion including a plurality of conduit headers and an annular shell portion including a plurality of conduits, wherein the plurality of conduits are configured to be coupled in flow communication with the plurality of conduit headers. The syngas cooler also includes a quench portion configured to remove particulates entrained in a flow of syngas flowing through the syngas cooler. The head portion and the shell portion are configured to be coupled together with a circumferential seam weld.

In another embodiment, a method for assembling a syngas cooler includes providing a head portion including a plurality of conduit headers, providing an annular shell portion including a plurality of conduits, and providing a quench portion configured to remove particulates entrained in a flow of syngas flowing through the syngas cooler. The method also includes coupling the quench portion to the shell portion, coupling the plurality of conduits in flow communication with the plurality of conduit headers, and coupling the head portion to the shell portion with a circumferential seam weld.

BRIEF DESCRIPTION OF THE DRAWINGS

Non-limiting and non-exhaustive embodiments are described with reference to the following figures, wherein like reference numerals refer to like parts throughout the various views unless otherwise specified

DETAILED DESCRIPTION OF THE INVENTION

Figure 1:
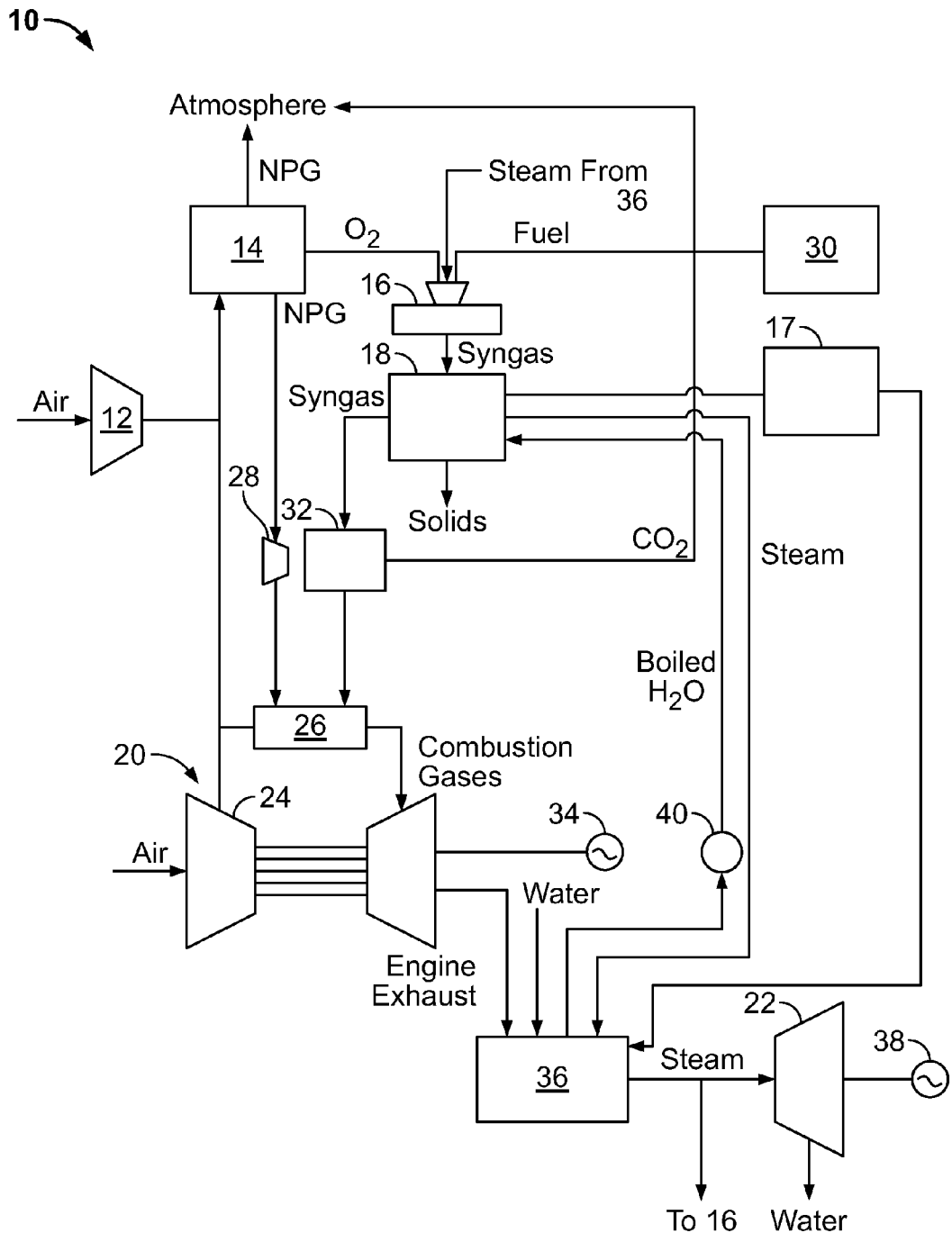
FIG. 1 is a block diagram of an exemplary integrated gasification combined-cycle (IGCC) power generation system.

FIG. 1 is a schematic diagram of an exemplary integrated gasification combined-cycle (IGCC) power generation system 10 in accordance with an embodiment of the present invention. In the exemplary embodiment, IGCC system 10 includes a main air compressor 12, an air separation unit (ASU) 14 coupled in flow communication to compressor 12, a gasifier 16 coupled in flow communication to ASU 14, a syngas cooler 18 coupled in flow communication to gasifier 16, a gas turbine engine 20 coupled in flow communication to syngas cooler 18, and a steam turbine 22 coupled in flow communication to syngas cooler 18.

In operation, compressor 12 compresses ambient air that is then channeled to ASU 14. In the exemplary embodiment, in addition to compressed air from compressor 12, compressed air from a gas turbine engine compressor 24 is supplied to ASU 14. Alternatively, compressed air from gas turbine engine compressor 24 is supplied to ASU 14, rather than compressed air from compressor 12 being supplied to ASU 14. In the exemplary embodiment, ASU 14 uses the compressed air to generate oxygen for use by gasifier 16. More specifically, ASU 14 separates the compressed air into separate flows of oxygen ($O_2$) and a gas by-product, sometimes referred to as a "process gas." The $O_2$ flow is channeled to gasifier 16 for use in generating partially oxidized gases, referred to herein as "syngas" for use by gas turbine engine 20 as fuel, as described below in more detail.

The process gas generated by ASU 14 includes nitrogen and will be referred to herein as "nitrogen process gas" (NPG). The NPG may also include other gases such as, but not limited to, oxygen and/or argon. For example, in the exemplary embodiment, the NPG includes between about 95% and about 100% nitrogen. In the exemplary embodiment, at least some of the NPG flow is vented to the atmosphere from ASU 14, and at some of the NPG flow is injected into a combustion zone (not shown) defined within a gas turbine engine combustor 26 to facilitate controlling emissions of engine 20, and more specifically to facilitate reducing the combustion temperature and reducing nitrous oxide emissions generated from engine 20. In the exemplary embodiment, IGCC system 10 includes a compressor 28 for compressing the nitrogen process gas flow before being injected into the combustion zone of gas turbine engine combustor 26.

In the exemplary embodiment, gasifier 16 converts a mixture of fuel supplied from a fuel supply 30, $O_2$ supplied by ASU 14, steam, and/or limestone into an output of syngas for use by gas turbine engine 20 as fuel. Although gasifier 16 may use any fuel, gasifier 16, in the exemplary embodiment, uses coal, petroleum coke, residual oil, oil emulsions, tar sands, and/or other similar fuels. Furthermore, in the exemplary embodiment, the syngas generated by gasifier 16 includes carbon dioxide.

In the exemplary embodiment, syngas generated by gasifier 16 is channeled to syngas cooler 18 to facilitate cooling the syngas, as described in more detail below. The cooled syngas is channeled from cooler 18 to a clean-up device 32 for use in cleaning the syngas before it is channeled to gas turbine engine combustor 26 for combustion thereof. Carbon dioxide ($CO_2$) may be separated from the syngas during clean-up and, in the exemplary embodiment, the $CO_2$ may be vented to the atmosphere. Gas turbine engine 20 drives a generator 34 that supplies electrical power to a power grid (not shown). Exhaust gases from gas turbine engine 20 are channeled to a heat recovery steam generator 36 that generates steam for driving steam turbine 22. Power generated by steam turbine 22 drives an electrical generator 38 that provides electrical power to the power grid. In the exemplary embodiment, steam from heat recovery steam generator 36 is supplied to gasifier 16 for generating syngas.

Furthermore, in the exemplary embodiment, system 10 includes a pump 40 that channels boiled water from steam generator 36 to syngas cooler 18 to facilitate cooling the syngas discharged from gasifier 16. The boiled water is channeled through syngas cooler 18 wherein the water is converted to steam. The steam from cooler 18 is channeled to a high pressure (HP) drum 17 and is then returned to steam generator 36 for use within gasifier 16, syngas cooler 18, and/or steam turbine 22.

Figure 2:
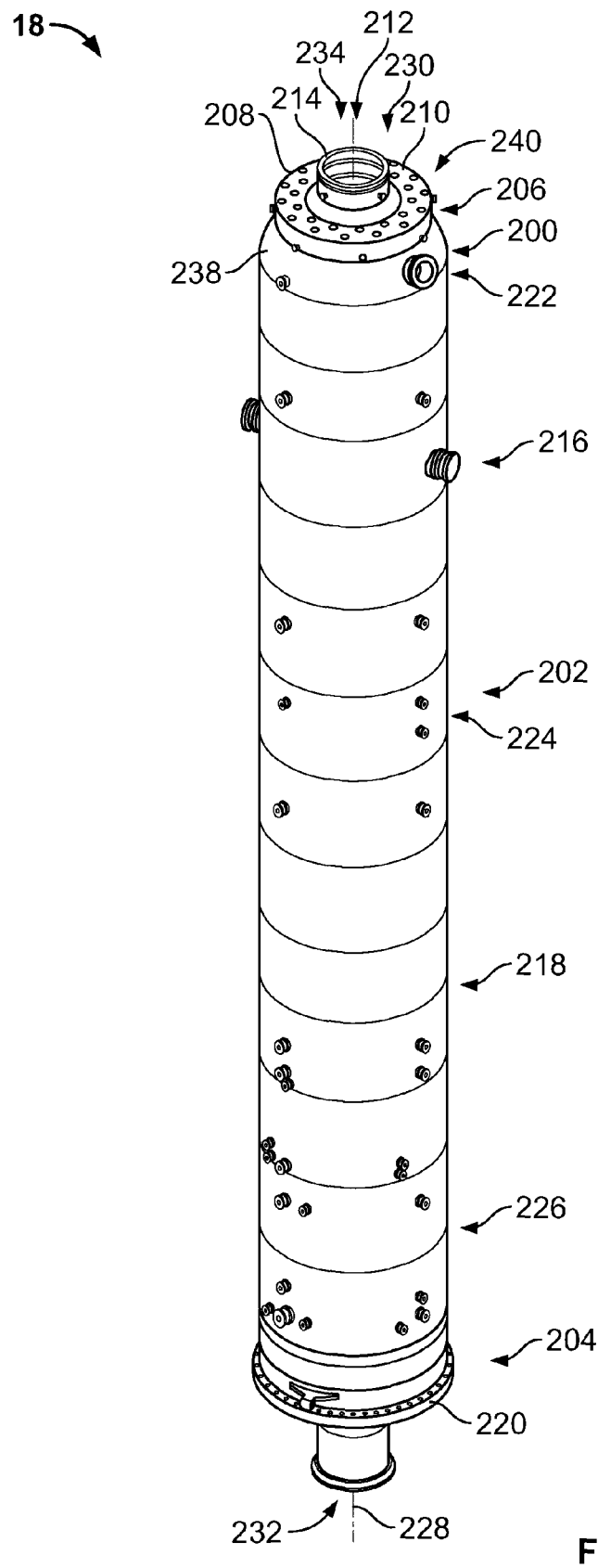
FIG. 2 is a perspective view of an exemplary radiant syngas cooler that may be used with the IGCC system shown in FIG. 1.

FIG. 2 is a perspective view of syngas cooler 18 (shown in FIG. 1). In the exemplary embodiment, syngas cooler 18 is a radiant syngas cooler. Syngas cooler 18 includes a head portion 200, a shell portion 202, and a quench portion 204. Head portion 200, shell portion 202, and quench portion 204 are coupled together substantially concentrically about a longitudinal centerline axis 228 of syngas cooler 18. As used herein, a "radial" direction is a direction that is substantially perpendicular to centerline 228, an "axial" direction is a direction that is substantially parallel to centerline 228, an "upward" direction is a direction that is generally towards a top opening 230 of syngas cooler 18, and a "downward" direction is a direction that is generally towards a bottom opening 232 of syngas cooler 18.

Head portion 200 is coupled to gasifier 16, to a feed injector assembly (not shown), and to shell portion 202. Head portion 200 includes a dome 206, a ring 208 including a plurality of axially-aligned openings 210 defined therein, and a throat 212 including a flange 214 that extends radially outward from throat 212. In the exemplary embodiment, dome 206 is substantially hemispherical, and an apex 240 of dome 206 includes an opening 234 defined therein. Throat 212 extends upward through dome opening 234 beyond an inner surface 236 (shown in FIG. 3) and an outer surface 238 of dome 206.

Flange 214 substantially circumscribes throat 212, and defines an outer perimeter of top opening 230. Ring 208 is coupled to dome 206, and is spaced substantially circumferentially about centerline 228 and throat 212. A plurality of ring openings 210 extend generally axially through ring 208, and through dome inner surface 236 and dome outer surface 238. In the exemplary embodiment, throat 212 and flange 214 are coupled in flow communication with gasifier 16, and each receives syngas discharged from gasifier 16.

In the exemplary embodiment, shell portion 202 includes an upper shell 216 and a lower shell 218 that are spaced substantially circumferentially about centerline 228. Upper shell 216 and lower shell 218 are coupled together in flow communication with each other. In the exemplary embodiment, shell portion 202 is fabricated from pressure vessel quality steel, such as, but not limited to, chromium molybdenum steel. As such, shell portion 202 is facilitated to withstand the operating pressures of syngas flowing through syngas cooler 18.

In the exemplary embodiment, quench portion 204 is coupled to shell portion 202 such that quench portion 204 is in flow communication with lower shell 218. In the exemplary embodiment, quench portion 204 includes a water-filled quench pool (not shown) for use in saturating the syngas, protecting components from high temperatures within quench portion 204, and collecting slag, unconverted char, and/or other solid particles entrained in the syngas flowing through syngas cooler 18. Quench portion 204 defines bottom opening 232 of syngas cooler 18. In the exemplary embodiment, bottom opening 232 is coupled in flow communication with a slag collection unit (not shown) to enable the collection of solid particles formed during gasification and/or cooling. A skirt 220 extends from quench portion 204 and at least partially circumscribes quench portion 204.

In the exemplary embodiment, syngas cooler 18 is assembled at a customer site, such as a power utility company. More specifically, head portion 200, upper shell 216, lower shell 218, and quench portion 204 are fabricated as separate components, and are delivered to the customer's site separately. In the exemplary embodiment, quench portion 204 is coupled to lower shell 218 via a coupling 226, and is coupled to upper shell 216 via a coupling 224. Head portion 200 is coupled to upper shell 216 via a coupling 222. In the exemplary embodiment, head coupling 222, shell coupling 224, and quench coupling 226 each use a circumferential seam weld. In an alternative embodiment, one of head coupling 222, shell coupling 224, and/or quench coupling 226 uses a circumferential seam weld.

In the exemplary embodiment, the circumferential seam weld includes a full penetration weld that is performed from the inside of syngas cooler 18, is gauged to sound metal from the outside of syngas cooler 18, and is welded from the outside of syngas cooler 18 to a complete penetration. In an alternative embodiment, the circumferential seam weld includes a full penetration weld that is performed using a combination of welding and gauging techniques including, but not limited to, a robotic welding with or without a backing strip or reinforcement, or any suitable welding and gauging techniques that achieve a substantially complete and efficient weld penetration. Head coupling 222 (also known as a "golden joint") facilitates eliminating the need for a flange connection between head portion 200 and upper shell 216.

Figure 3:
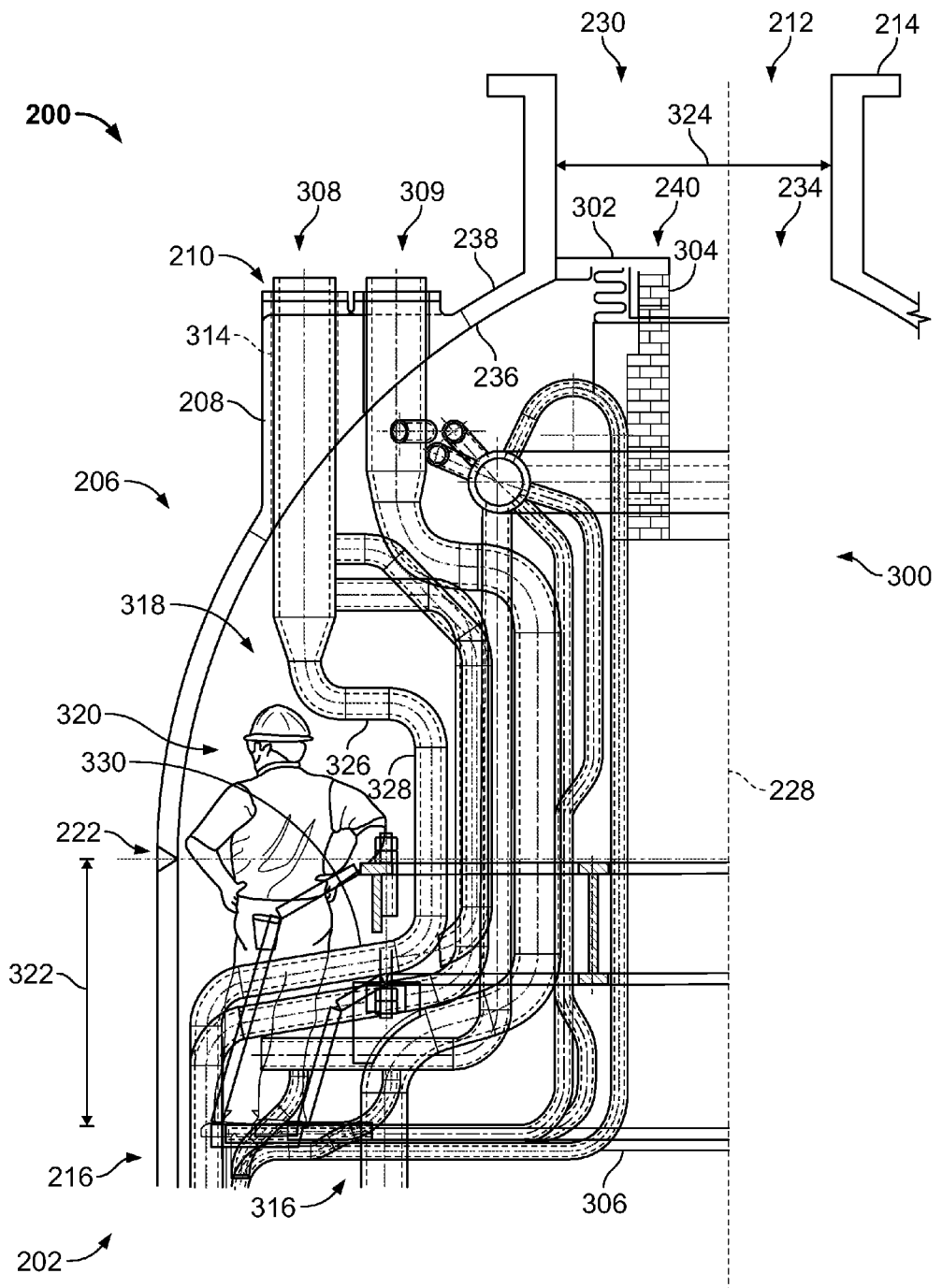
FIG. 3 is a cross-sectional view of a portion of an exemplary head portion and a shell portion used with the radiant syngas cooler shown in FIG. 2.

FIG. 3 shows a cross-sectional view of a portion of head portion 200 and shell portion 202 of syngas cooler 18. In the exemplary embodiment, head portion 200 includes dome 206, ring 208, throat 212, and flange 214. As described in more detail above, throat 212 extends upward from dome 206 to flange, and downward from dome 206 to a dome floor 306. Dome floor 306 includes a plurality of heat transfer conduit openings 316 that are spaced circumferentially about centerline 228. Dome floor 306 is spaced a distance 322 downward from head coupling 222. In the exemplary embodiment, distance 322 is selected to enable a worker 320 to be able to stand on floor 306 and easily access head coupling 222.

A refractory lining bracket 302 is coupled about an inner perimeter 324 of throat 212, such that bracket 302 extends from dome 206 to dome floor 306. Syngas discharged from gasifier 16 flows through throat 212 and refractory lining bracket 302. As such, throat 212 and refractory lining bracket 302 are exposed to the high temperatures of the syngas flow. In an alternative embodiment, refractory lining bracket 302 extends upwardly and radially inwardly from throat 212, and includes a plurality of stackable bricks 304. In an alternative embodiment, refractory lining bracket 302 is a castable refractory material that is formed in a shape that fits through opening 234.

In the exemplary embodiment, dome 206 includes a plurality of downcomers 308 and risers 309. Risers 309 extend generally axially through heat transfer conduit openings 316. Each downcomer 308 and riser 309 includes a header 314 that extends upward through a corresponding ring opening 210. More specifically, in the exemplary embodiment, downcomers 308, risers 309, and headers 314 substantially circumscribe throat 212 and centerline 228.

In the exemplary embodiment, in addition to downcomers 308 and risers 309, shell portion 202 also includes a heat transfer wall (also referred to herein as a "tube wall") (not shown), and a plurality of heat transfer panels (also referred to herein as "platens") (not shown). More specifically, in the exemplary embodiment, downcomers 308 are positioned radially inward of shell portion 202, risers 309 are positioned radially inward of downcomers 308, the tube wall is positioned radially inward of risers 309, and the platens are spaced within the tube wall such that the tube wall substantially circumscribes the platens. In the exemplary embodiment, downcomers 308 channel water from HP drum 17 (shown in FIG. 1) and/or steam generator 36 (shown in FIG. 1) to the tube wall and the platens. Risers 309 channel steam to HP drum 17 and/or steam generator 36 for use within gasifier 16, syngas cooler 18, and/or steam turbine 22 (shown in FIG. 1). In an alternative embodiment, downcomers 308 and risers 309 channel an alternate heat transfer medium from and to HP drum 17 and/or steam generator 36.

In the exemplary embodiment, to facilitate access to head coupling 222, each downcomer 308 and each riser 309 is angled radially inward adjacent to head coupling 222, such that a substantially "C" shaped segment 318 is defined by downcomers 308 and risers 309. More specifically, each segment 318 includes a portion 326 that is angled radially inward from shell portion 202, a portion 328 that extends downward from radially inward portion 326, and a portion 330 that extends radially outward from downward portion 328 towards shell portion 202. Alternatively, each segment 318 curves radially inward in an arcuate shape, or is formed with any other shape that facilitates access to head coupling 222. As such, the combination of distance 322, i.e. the relative location of dome floor 306 and head coupling 222, and the shape of heat transfer conduit segments 318, enables head portion 200 to be welded to shell portion 202 in an ergonomically-friendly location.

During assembly of syngas cooler 18, lower shell 218 is positioned on top of quench portion 204 prior to being coupled to quench portion 204 at quench coupling 226. Upper shell 216 is then positioned on top of lower shell 218, and upper and lower shells 216 and 218 are then coupled together along shell coupling 224. In the exemplary embodiment, quench coupling 226 and shell coupling 224 are coupled with circumferential seam welds. Internal components, such as downcomers 308 and risers 309, are then coupled within shell portion 202.

During assembly of head portion 200, head portion 200 is positioned on top of upper shell 216 and the internal components, such as heat transfer conduit headers 314, are extended through ring openings 210. Conduit headers 314 are welded to ring 208 and/or ring openings 210. In the exemplary embodiment, head portion 200 is coupled to upper shell 216 at head coupling 222 with a circumferential seam weld. Cooler 18 is then hydrotested to verify proper assembly.

During operation, hot syngas flows through throat 212 and through refractory lining bracket 302 and/or bricks 304. Syngas flows into a cooling chamber (not shown) defined within shell portion 202 and, through heat transfer with downcomers 308, transfers heat to water in downcomers 308 to produce steam in risers 309. The steam is channeled through risers 309 to HP drum 17 and to steam generator 36. As such, the syngas is cooled as it flows through shell portion 202. The syngas is then discharged into quench portion 204 and through a quench pool (not shown). Slag, unconverted char, and/or other solid particles entrained in the syngas are removed in the quench pool. The slag and other solids collected in the quench pool are gravity-fed into a slag collection unit (not shown), and the substantially cooled syngas is channeled from syngas cooler 18 into a syngas scrubber (not shown), to a gas turbine engine 20 (shown in FIG. 1), and/or to another destination.

The above-described embodiments provide an efficient and cost-effective syngas cooler, and an associated method for assembling a syngas cooler for use in an integrated gasification combined-cycle (IGCC) power generation system. The methods described herein enable the syngas cooler components to be coupled together in a more efficient and cost-effective manner than is possible with known syngas coolers. Moreover, the methods enable the syngas cooler to be assembled using a reduced amount of welding and/or other coupling mechanisms as compared to known syngas coolers. Furthermore, the amount of time that a machine is required to lift and support components of the syngas cooler described herein is facilitated to be reduced as compared to known syngas coolers. In addition, the methods and systems described herein provide a more reliable coupling mechanism for use by a syngas cooler.

Exemplary embodiments of a gasification system, a syngas cooler, and a method for assembling a syngas cooler are described above in detail. The method, syngas cooler, and gasification system are not limited to the specific embodiments described herein, but rather, components of the gasification system and/or steps of the method may be utilized independently and separately from other components and/or steps described herein. For example, the methods of assembly described herein may also be used in combination with other components, systems, and/or methods of assembly, and are not limited to practice with only the gasification system as described herein. Rather, the exemplary embodiment can be implemented and utilized in connection with many other pressure vessel applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A syngas cooler for use in a gasification system, said syngas cooler comprising:
    a head portion comprising a plurality of conduit headers and a substantially vertical annular wall coupled to an exterior surface of said head portion, said annular wall extending about a centerline axis of said head portion, said plurality of conduit headers extending through said annular wall;
    an annular shell portion comprising a plurality of conduits, said plurality of conduits coupled in flow communication with said plurality of conduit headers;
    a quench portion configured to remove particulates entrained in a flow of syngas flowing through said syngas cooler; and
    at least one circumferential seam weld coupling said annular shell to said head portion,
    wherein each of said plurality of conduits comprise a segment that is oriented generally radially inward from said shell portion and substantially circumferentially about said shell portion to facilitate access to said circumferential seam weld from inside said syngas cooler.

2. A syngas cooler in accordance with claim 1, wherein said plurality of conduits is circumferentially-spaced about said shell portion.

3. A syngas cooler in accordance with claim 1, wherein said radially inward segment is oriented to facilitate said head portion being circumferentially welded to said shell portion.

4. A syngas cooler in accordance with claim 1, wherein said at least one circumferential seam weld couples said shell portion and said quench portion together.

5. A gasification system, said system comprising:
    a gasifier; and
    a syngas cooler comprising:
        a head portion comprising a plurality of conduit headers and a substantially vertical annular wall coupled to an exterior surface of said head portion, said annular wall extending about a centerline axis of said head portion, said plurality of conduit headers extending through said annular wall;
        an annular shell portion comprising a plurality of conduits, said plurality of conduits coupled in flow communication with said plurality of conduit headers;
        a quench portion configured to remove particulates entrained in a flow of syngas flowing through said syngas cooler; and
        at least one circumferential seam weld coupling said annular shell to said head portion,
    wherein each of said plurality of conduits comprise a segment that is oriented generally radially inward from said shell portion and substantially circumferentially about said shell portion to facilitate access to said circumferential seam weld from inside said syngas cooler.

6. A gasification system in accordance with claim 5, wherein said plurality of conduits is circumferentially-spaced about said shell portion.

7. A gasification system in accordance with claim 5, wherein said radially inward segment is oriented to facilitate said head portion being circumferentially welded to said shell portion.

8. A gasification system in accordance with claim 5, wherein said at least one circumferential seam weld couples said shell portion and said quench portion together.

9. A gasification system in accordance with claim 5, wherein said quench portion is substantially enclosed by a skirt assembly.

* * * * *